(12) United States Patent
Frederiksen

(10) Patent No.: US 7,102,796 B2
(45) Date of Patent: *Sep. 5, 2006

(54) NETWORK PRINTING SYSTEM USING A PROCESS POWER BROKER FOR DIRECTING PRINT JOB FROM BUSY MACHINES TO IDLE MACHINES FOR PROCESSING ONLY BEFORE PRINTING

(75) Inventor: Dellas G. Frederiksen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 776 days.

This patent is subject to a terminal disclaimer.

(21) Appl. No.: 09/935,806

(22) Filed: Aug. 23, 2001

(65) Prior Publication Data

US 2003/0041145 A1    Feb. 27, 2003

(51) Int. Cl.
*H04N 1/00* (2006.01)
(52) U.S. Cl. .................................... 358/407; 718/105
(58) Field of Classification Search ............... 709/201, 709/225, 226, 223; 358/1.15, 407; 718/104, 718/105, 108
See application file for complete search history.

(56) References Cited

U.S. PATENT DOCUMENTS

| | | | |
|---|---|---|---|
| 5,537,626 A * | 7/1996 | Kraslavsky et al. ........... 710/8 |
| 5,574,831 A * | 11/1996 | Grenda ........................ 358/1.4 |
| 5,978,560 A * | 11/1999 | Tan et al. ................... 358/1.15 |
| 6,098,091 A | 8/2000 | Kisor | |
| 6,192,388 B1 | 2/2001 | Cajolet | |
| 2002/0015180 A1 * | 2/2002 | Tominaga ................... 358/1.15 |
| 2002/0089687 A1 * | 7/2002 | Ferlitsch et al. ........... 358/1.15 |

FOREIGN PATENT DOCUMENTS

WO     WO01/14961     3/2001

OTHER PUBLICATIONS

Tandiary, F. et al; "Batrun: utilizing idle workstations for large scale computing" IEEE Parallel and Distributed Technology: Systems and Applications, XX, XX, vol. 4, No. 2, Jun. 21, 1996, pp. 41-48, XP002124512 ISSN: 1063-6552 p. 44, left-hand column, line 3—p. 47, left-hand column, line 5; figures 2-5.

Hou, C-J. et al; "Implementation of decentralized load sharing in networked workstations using the condor package" Journal of Parallel and Distributed Computing, Academic Press, Duluth, MN, US, vol. 40, No. 2, Feb. 1, 1997, pp. 173-184, XP004419084 ISSN: 0743-7315 the whole document.

* cited by examiner

*Primary Examiner*—Le H. Luu

(57) ABSTRACT

A compute cycle brokering apparatus and method includes a network and a plurality of machines connected to the network wherein some machines are idle and some machines are busy. A process power broker is connected to the network for locating available process power on idle machines and directing pending jobs from busy machines to the idle machines for processing. Further, a job director is provided for directing job output either back to the busy machine for output or to the first available idle machine on the network for output once processing is completed.

20 Claims, 1 Drawing Sheet

NETWORK PRINTING SYSTEM USING A PROCESS POWER BROKER FOR DIRECTING PRINT JOB FROM BUSY MACHINES TO IDLE MACHINES FOR PROCESSING ONLY BEFORE PRINTING

FIELD OF THE INVENTION

This invention relates to a compute cycle brokering apparatus and method. In particular, the invention relates to a compute cycle brokering apparatus and method in a network of a plurality of machines connected to the network wherein some machines are idle and some are busy. A process power broker is connected to the network and locates available process power on idle machines and directs pending jobs from busy machines to the idle machines for processing.

BACKGROUND OF THE INVENTION

Time is one commodity no business can afford to waste. In their efforts to conserve time, businesses have turned more and more to machines. As machines have become increasingly advanced technologically, their usefulness to businesses have increased. As the march of progress has continued, single machines now handle multiple tasks. These so-called "Multi functional peripherals" (MFPs), are capable of accomplishing multiple tasks such as printing, copying, and the like. A business with several MFPs may network them for greater efficiency.

Nonetheless, even networked machines, including MFPs, do not ensure that a business will be able to process jobs as quickly as possible. One difficulty encountered is that machines that are busy may not process new jobs. This results in a "stack" or a "job queue" of pending jobs for busy machines.

One prior art "solution" is for a business person to access the network and attempt to determine which machine(s) may be idle and available for processing jobs. Here, the solution is sometimes worse than the problem in that the time spent searching is greater than the time required to just wait for the job to come up in its normal course. Additionally, not all business people are skilled in manipulating networked machines.

Thus, there is a need in the art for providing an apparatus and method that enables a user to enhance the speed of processing a job by means of a group of networked machines.

SUMMARY OF THE INVENTION

Accordingly, the compute cycle brokering apparatus and method of the present invention includes a network and a plurality of machines connected to the network wherein some machines are idle and some machines are busy. A process power broker is connected to the network and locates available process power on the idle machines and directs pending jobs from busy machines to the idle machines for processing.

In a further embodiment, the process power broker further includes a job director for directing job output back to the busy machine for output once the job is processed. In another embodiment, the process power broker includes a job director for directing job output to the first available idle machine for output.

In a further aspect, the machines of the invention are MFPs and/or printers. In a still further aspect of the invention, the network includes an intranet and/or the Internet.

In another preferred embodiment of the invention, a method for compute cycle brokering includes the steps of providing a network and connecting a plurality of MFPs to the network wherein some MFPs are idle and some MFPs are busy. A process power broker is connected to the network for locating available process power on idle MFPs and directing pending jobs from busy MFPs to the idle MFPs for processing.

In one aspect of the method, a job director is provided for directing job output back to the busy MFP, and/or to the first available MFP, for output. In other aspects of the invention, the step of connecting to a network includes the step of connecting to an intranet and/or Internet network. In a further aspect, a plurality of printers are connected to the network.

In a still further preferred embodiment, in a network of MFPs, a computer program product for compute cycle brokering includes a computer program product with instructions for identifying MFPs on the network that are idle and MFPs on the network that are busy. The computer program product further includes instructions for a process power broker for locating available process power on idle MFPs and directing pending jobs from busy MFPs to idle MFPs for processing. In other aspects of the invention, the computer program code further includes instructions for a job director for directing a job output back to the busy MFP for output and/or back to the first available MFP for output.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
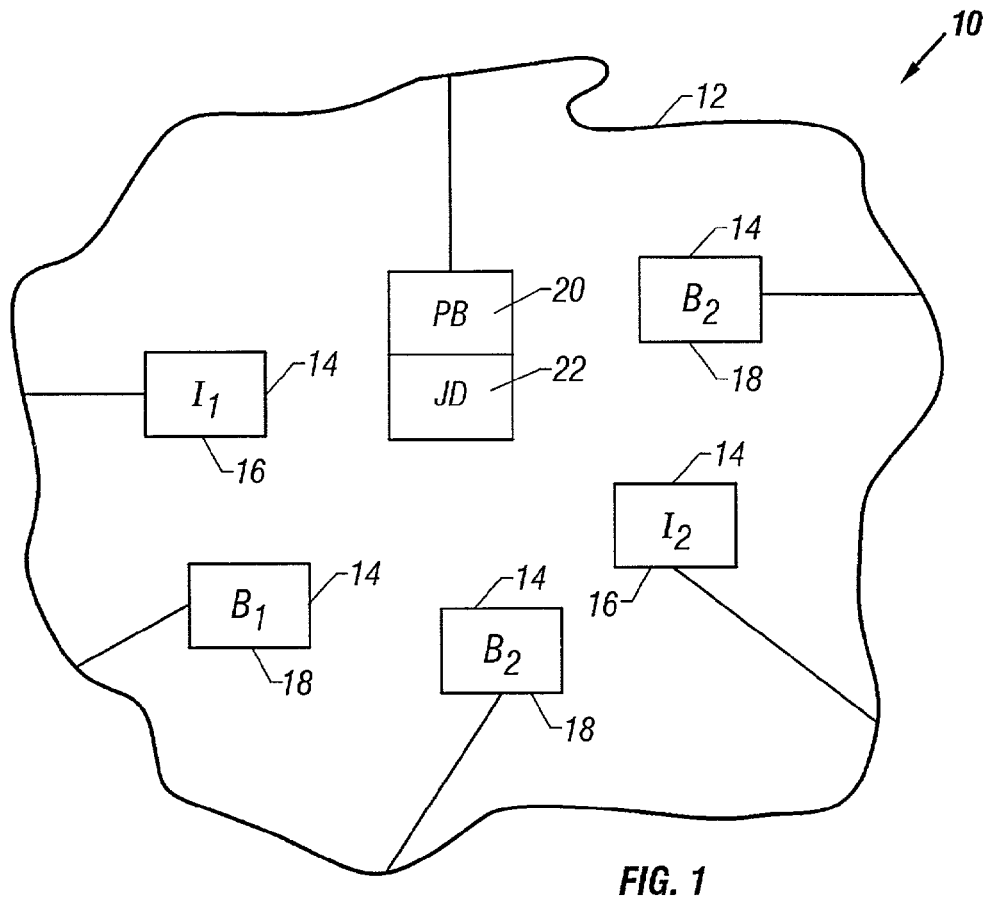
FIG. 1 is a schematic diagram of the compute cycle brokering apparatus of the present invention.
Figure 2:
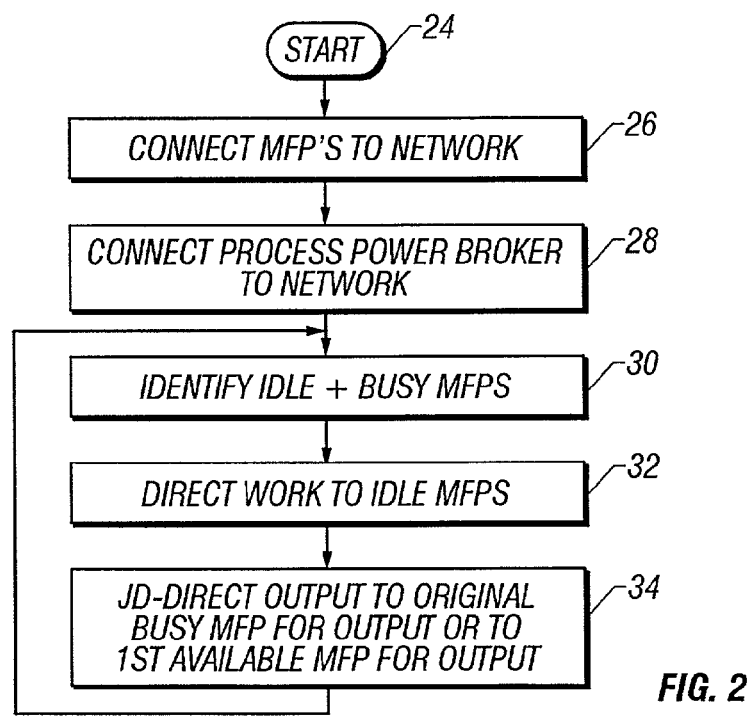
FIG. 2 is a flow diagram of the method of the present invention.

The preferred embodiment of the present invention is illustrated by way of example in FIGS. 1 and 2. With specific reference to FIG. 1, the compute cycle brokering apparatus 10 of the present invention includes network 12 and a plurality of machines 14 connected to network 12. Some machines 14 are idle machines 16 and some machines 14 are busy machines 18. A process power broker 20 is connected to network 12. Process power broker 20 is conformed to locate available process power on idle machines 16 and directs pending jobs from busy machines 18 to the idle machines 16 for processing.

In a preferred embodiment, process power broker 20 includes a job director 22. Job director 22 directs job output back to the busy machine 18 for output once processing is complete. In another aspect of the invention, job director 22 directs job output to the first available machine 14 for output. That is to say, if, once a job is processed, the original busy machine 18 is still busy and/or no machines 14 are available, job director 22 directs job output to the first available idle machine 16.

In a further aspect of the invention, machines 14 are MFPs and/or printers. In another aspect of the invention, network 12 is an intranet and/or the Internet.

By way of example only, and not limitation, in a preferred embodiment, the invention is directed to a network of a plurality of MFPs, wherein some MFPs are busy and some MFPs are idle. This is a typical occurrence in most business environments today. That is to say, machines are doing more and more jobs and more machines are connected to networks all the time. By means of the present invention, process power broker 20 is connected to network 12, either intranet or Internet, and process power broker 20 identifies idle MFPs 16 and busy MFPs 18. Thereafter, process power broker 20 directs pending jobs from busy MFPs 18 to idle MFPs 16 for processing. By way of further explanation and not by limitation, process power broker 20 of the present invention may be any computing device, PC, server, unix device of the like now known or hereinafter developed conformed to check and record and pass on the status of machine connected to the network 12, as discussed and disclosed herein. Likewise, job director 22 may also be any computing device now known or hereafter developed. Again, in this preferred embodiment, job director 22 is provided for directing job output to the busy MFP 18 for output.

Each MFP 14 has a "job queue". In addition, each MFP 14 has job information specifying the number of pages and in some cases the complexity of those pages. Job director 22 checks the job queue on each MFP 14 and determines blocked jobs and their complexity. Once these jobs have been identified, their memory location (on the MFP 14) is determined and a DMA process is set up by the job director 22 to move the job to a different machine via the network. The command could also be sent along with this to produce a file on the output as opposed to printed page (print to file) (Note, if a send job, the new MFP 14 can do the send function also). This new job is added to the MFP 14's job queue. The job director 22 determines when the job is done and in a similar manner moves the output file back to the original MFP 14 or next available MFP 14 to print.

Referring now to FIG. 2, a flow diagram of the method of the present invention is illustrated. In block 24, the method starts with the creation of network 12. Again, this can be any network now known or hereafter developed including intranet and Internet networks. Next, in block 26, MFPs are connected to the network 12. In block 28, process power broker 20 is connected to network 12. In block 30, process power broker 20 identifies idle MFPs 16 and busy MFPs 18. Once identified, in block 32, process power broker 20 directs work i.e. copy jobs, print jobs, and the like, to idle MFPs 16 for processing. In block 34, job director 22 is provided and job director 22 directs output to the original busy MFP 18 for output or to the first available idle MFP 16 for output.

Importantly, as illustrated in FIG. 2, the algorithm and method of the present invention requires that, after the completion of block 34, the process begins re-evaluating the network 12 status again at block 30. As a result of this continuous "loop", the apparatus and method of the present invention ensures the maximum utilization of machines 14 connected to network 12 with a minimum of wasted time.

In another preferred embodiment of the invention, in a network of MFPs, a computer program product for compute cycle brokering is provided wherein the computer program product includes instructions for identifying MFPs on the network 12 that are idle and MFPs on the network 12 that are busy. Further, the computer program code of this embodiment includes instructions for a process power broker 20 for locating available process power on idle MFPs 16 and directing pending jobs from busy MFPs 18 to idle MFPs 16 for processing.

In another aspect of this embodiment of the invention, the computer program product further includes instructions for a job director 22 for directing a job output back to either the busy MFP 18 or to the first available idle MFP 16 for output once processing is complete.

The description of the present embodiments of the invention have been presented for purposes of illustration but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there may be other embodiments which fall within the spirit and scope of the invention as defined by the following claims.

What is claimed:

1. A compute cycle brokering apparatus comprising:
   a) a network;
   b) a plurality of printing machines connected to said network wherein some printing machines are idle and some printing machines are busy;
   c) a process power broker connected to said network for locating available processing power on idle printing machines and directing a pending print job from a busy printing machine to an idle printing machine for processing only of the print job at the idle printing machine before printing; and
   d) a job director for directing the processed print job back to the busy printing machine for printing.

2. The apparatus of claim 1 wherein the job director directs the processed print job to an available printing machine for printing if the busy printing machine is still busy.

3. The apparatus of claim 1 wherein the job director directs the processed print job to a first available printing machine for printing if the busy printing machine is still busy.

4. The apparatus of claim 1 wherein the printing machines are MFPs.

5. The apparatus of claim 1 wherein the printing machines are printers.

6. The apparatus of claim 1 wherein the network comprises an intranet.

7. The apparatus of claim 1 wherein the network comprises the Internet.

8. A network of a plurality of MFPs wherein some MFPs are busy and some MFPs are idle, the network including a compute cycle brokering apparatus comprising a process power broker that identifies idle MFPs and directs a pending print job from a busy MFP to an idle MFP for processing only of the print job before printing and which further comprises a job director that directs the print job back to the busy MFP for printing after the print job has been processed by the idle MFP.

9. The apparatus of claim 8 wherein the job director directs the print job to a first available idle MEP for printing if the busy MFP is still busy.

10. The apparatus of claim 8 wherein the network is the Internet.

11. The apparatus of claim 8 wherein the MFPs are printers.

12. A method for compute cycle brokering, the method comprising the steps of:
    a) providing a network;
    b) connecting a plurality of MFPs to said network wherein some MFPs are idle and some MFPs are busy;

c) connecting a process power broker to said network for locating available processing power on idle MFPs and directing a pending print job from a busy MFP to an idle MFP for processing only of the pending print job before printing; and d) providing a job director for directing the pending print job back to the busy MFP for printing after processing by the idle MFP.

13. The method of claim 12 further comprising the step of the job director directing the pending print job to an available MFP for printing if the busy MFP is still busy.

14. The method of claim 12 further comprising the step of the job director directing the pending print job to a first available MFP for printing if the busy MFP is still busy.

15. The method of claim 12 wherein connecting said plurality of MFPs to said network comprises the step of connecting a plurality of printers to the network.

16. The method of claim 12, wherein providing said network comprises providing an intranet network.

17. The method of claim 12, wherein providing said network comprises providing an Internet network.

18. In a network of MFPs, a computer program product containing computer readable medium encoded with program instructions for compute cycle brokering, the computer program product comprising:

a) instructions for identifying MFPs on the network that are idle and MFPs on the network that are busy;

b) instructions for a process power broker for locating available processing power on idle MFPs and directing a pending print job from a busy MFP to an idle MFP for processing only of the pending print job before printing; and c) instructions for a job director for directing the pending print job back to the busy MFP for printing after processing by the idle MFP.

19. The computer program product of claim 18 further comprising instructions for the job director for directing the pending print job to an available MFP for printing if the busy MFP is still busy.

20. The computer program product of claim 18 further comprising instructions for the job director for directing the pending print job to a first available MFP for printing if the busy MFP is still busy.

* * * * *

UNITED STATES PATENT AND TRADEMARK OFFICE
CERTIFICATE OF CORRECTION

PATENT NO. : 7,102,796 B2  Page 1 of 1
APPLICATION NO. : 09/935806
DATED : September 5, 2006
INVENTOR(S) : Dellas G. Frederiksen It is certified that error appears in the above-identified patent and that said Letters Patent is hereby corrected as shown below:

In column 4, line 57, in Claim 9, delete "MEP" and insert -- MFP --, therefor.

In column 5, line 6, in Claim 12, delete "ajob" and insert -- a job --, therefor.

Signed and Sealed this

Twenty-sixth Day of May, 2009

JOHN DOLL
*Acting Director of the United States Patent and Trademark Office*